(12) United States Patent
Baligar et al.

(10) Patent No.: US 10,997,963 B1
(45) Date of Patent: May 4, 2021

(54) VOICE BASED INTERACTION BASED ON CONTEXT-BASED DIRECTIVES

(71) Applicant: Amazon Technologies, Inc., Seattle, WA (US)

(72) Inventors: Vikas Baligar, Seattle, WA (US); Charles Allen, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 15/982,955

(22) Filed: May 17, 2018

(51) Int. Cl.
G10L 13/08 (2013.01)
G10L 15/26 (2006.01)
G06Q 30/06 (2012.01)
G10L 15/08 (2006.01)

(52) U.S. Cl.
CPC .......... *G10L 13/08* (2013.01); *G06Q 30/0641* (2013.01); *G10L 15/08* (2013.01); *G10L 15/26* (2013.01)

(58) Field of Classification Search
CPC ...... G06F 3/04842; G06F 3/167; G06F 17/28; G06F 16/438; H04N 21/42207; H04N 21/4126
USPC .... 704/274, 257, 231, 9, 235, 260; 381/300; 345/158, 419
See application file for complete search history.

(56) References Cited

U.S. PATENT DOCUMENTS

| 5,488,652 | A * | 1/1996 | Bielby | G10L 15/063 |
| | | | | 379/213.01 |
| 6,507,643 | B1 * | 1/2003 | Groner | H04M 3/5307 |
| | | | | 379/88.14 |
| 6,556,970 | B1 * | 4/2003 | Sasaki | G01C 21/3608 |
| | | | | 382/100 |
| 7,139,717 | B1 * | 11/2006 | Abella | G10L 15/1822 |
| | | | | 704/275 |
| 10,026,394 | B1 * | 7/2018 | Carbon | G10L 15/00 |
| 10,331,312 | B2 * | 6/2019 | Napolitano | G06F 16/48 |
| 2002/0191775 | A1 * | 12/2002 | Boies | H04M 3/487 |
| | | | | 379/266.01 |
| 2005/0261034 | A1 * | 11/2005 | Punaganti | H04M 1/642 |
| | | | | 455/567 |
| 2008/0243501 | A1 * | 10/2008 | Hafsteinsson | H04W 4/14 |
| | | | | 704/235 |
| 2009/0292529 | A1 * | 11/2009 | Bangalore | H04M 3/4936 |
| | | | | 704/9 |
| 2011/0004669 | A1 * | 1/2011 | Navar | G06F 21/6209 |
| | | | | 709/217 |
| 2012/0223885 | A1 * | 9/2012 | Perez | A63F 13/52 |
| | | | | 345/158 |
| 2012/0245944 | A1 * | 9/2012 | Gruber | H04M 1/72448 |
| | | | | 704/270.1 |

(Continued)

*Primary Examiner* — Akwasi M Sarpong
(74) *Attorney, Agent, or Firm* — Lee & Hayes, P.C.

(57) ABSTRACT

A voice assistant service (VAS) may receive an audio request from a user via a first device via a voice assistant application executed by the first device. The VAS may determine that the audio request references a context queue that stores log information about user-interaction with a second device. The VAS may analyze the log information from the context queue to determine a context of the audio request as a supplemented request. The VAS may determine a response based on the supplemented text request. The response may be an audio response and/or an action, such as a computing action. The VAS may provide an audible response to the voice assistance application for output to the user.

20 Claims, 9 Drawing Sheets

(56) References Cited

U.S. PATENT DOCUMENTS

| | | | | |
|---|---|---|---|---|
| 2013/0152092 A1* | 6/2013 | Yadgar | ............ | G10L 15/22 |
| | | | | 718/102 |
| 2013/0262107 A1* | 10/2013 | Bernard | ............ | G06F 16/40 |
| | | | | 704/235 |
| 2013/0322634 A1* | 12/2013 | Bennett | ............ | G10L 21/00 |
| | | | | 381/17 |
| 2013/0322665 A1* | 12/2013 | Bennett | ............ | G01C 21/3629 |
| | | | | 381/300 |
| 2014/0256361 A1* | 9/2014 | Gailey | ............ | G06Q 30/0207 |
| | | | | 455/456.3 |
| 2015/0095188 A1* | 4/2015 | Lee | ............ | G06Q 30/0633 |
| | | | | 705/26.8 |
| 2016/0378080 A1* | 12/2016 | Uppala | ............ | G10L 15/22 |
| | | | | 700/275 |
| 2017/0068423 A1* | 3/2017 | Napolitano | ............ | G06F 3/0482 |
| 2018/0144590 A1* | 5/2018 | Mixter | ............ | G08B 5/36 |
| 2018/0190264 A1* | 7/2018 | Mixter | ............ | G06F 3/167 |
| 2019/0172452 A1* | 6/2019 | Smith | ............ | G10L 15/22 |

* cited by examiner

VOICE BASED INTERACTION BASED ON CONTEXT-BASED DIRECTIVES

BACKGROUND

Many different ways have been introduced to allow users to interact with computing devices, such as through use of mechanical devices (e.g., keyboards, mice, etc.), touch screens, motion, gesture, and even using natural language input such as speech. Furthermore, many of these computing devices are further connected to remote computing resources, such as cloud-based resources, that extend functionality afforded by the local computing devices.

As computing devices in homes and offices continue to evolve, users expect a more seamless and timely experience when interacting with cloud-based resources through the local computing devices. Additionally, users expect a more robust set of services when interacting with cloud-based resources through the local computing devices. In particular, users expect accurate, intuitive, and relatively quick interactions with computing devices in order to instruct the computing devices to perform desired functions.

In some environments, use of a voice assistant service may augment computing operations performed using conventional devices or applications, which may rely on traditional modes of input/output.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to augmenting information provided by content provider using a first device or first application using a voice assistant service via a second device or second application.

The voice assistant system may include any system and/or device that receives audio commands from a user, processes the audio, possibly using speech to text algorithms and/or natural language processing (NLP) algorithms, to determine text, returns a reply based on the text, converts the reply to an audio output using text to speech algorithms, and causes a speaker to output the audio output. Examples of voice assistant systems include Alexa® provided by Amazon.com® of Seattle, Wash., Siri® provided by Apple Corp.® of Cupertino, Calif., and Cortana® provided by Microsoft Corp.® of Redmond, Wash. The voice assistant system may include a user device that typically includes at least a network interface, a microphone, and a speaker. The user device may be a smart phone, a dedicated device, and/or other devices controlled by users and located proximate to the users. The voice assistant system may include a service engine, which may be stored in a remote location (e.g., via remote computing devices such as in a cloud computing configuration, etc.), stored in a local device (e.g., a smartphone, a dedicated voice assistant device, etc.) and/or a combination of both.

In some embodiments, the voice assistant system may enable a user to order items, select fulfillment details for the items, pay for the items, and/or perform other tasks to enable the user to obtain information or the items using voice activated commands and without reliance on a graphical user interface. In various embodiments, the voice assistant system may leverage prior user interaction data, user profile information, and/or other user information during interaction with a user to supplement voice inputs received from a user.

In an example, use-case, a user may view content on a browser application, such as an item the user may desire to purchase. The user may make an audible request to a voice assistant application, which may be running on the same device as the browser application or on a second device. The audible request may include a reference to the content provided by the browser application, such as "buy this" or "show me more," among other possible requests that are associated with the content and rely on the knowledge of the content to provide context for the audible request. A voice assistance service may associate use of the voice assistant application with use of the browser application, such as by way of a shared user profile associated with the applications. In some embodiments, the voice assistant service may access log information provided to a context queue, which may store some, but possibly not all, information pertaining to a request or action, and metadata associated with content provided by the browser application and/or other applications associated with the voice assistant service via the user profile or by association with other data. The voice assistant service may analyze the content provided by the browser application, possibly stored as a log or as other information, to determine a context of the audible request, and thus to determine a supplemented audible request. The voice assistance service may then generate a response to the supplemented audible request, which may be provided back to a user by the voice assistance application or by other outputs, such as by refreshing information provided by the browser application. In some embodiments, the voice assistance service may initiate a transaction to acquire an item on behalf of a user, where the item is viewed by the user via the browser application, but the transaction is preformed via the voice assistant application that is a different application than the browser application.

In some embodiments, the voice assistant application may access, after receiving user consent, information from another application operating on the same device, such as a browser application or other third party application. For example, the voice assistant application may receive an audible request. The voice assistant application may then access information associated with an application that has is associated with user activity within a threshold amount of time, or otherwise referred to as "active" or "in focus" by a user. For example, the threshold period of time may be a number of seconds or minutes, such as five seconds, one minute, or other amounts of time. The voice assistant application may access data from the application, such as a uniform resource locator (URL), an item identifier, an image or screenshot, or other data that indicates content provided by the application. The voice assistant application may transmit this information form the application to a voice assistance service to enable augmenting the audible request, such as to provide context to the audible request. For example, if the voice assistant application receives an audible request of "buy this", the voice assistant service may determine the item represented by the term "this" and may create a response accordingly.

The voice assistant service may user information from different applications and different devices to augment a response to an audible request. For example, the voice assistant service may cause the voice assistant application to output an audio reply that complements information presented by a different application. The voice assistant service may answer a question, initiate a transaction, store data for later retrieval by a user via a user device, cause the application to refresh and provide different information to the user, and/or perform or provide other augmented services or information.

The techniques and systems described herein may be implemented in a number of ways. Example implementations are provided below with reference to the following figures.

Figure 1:
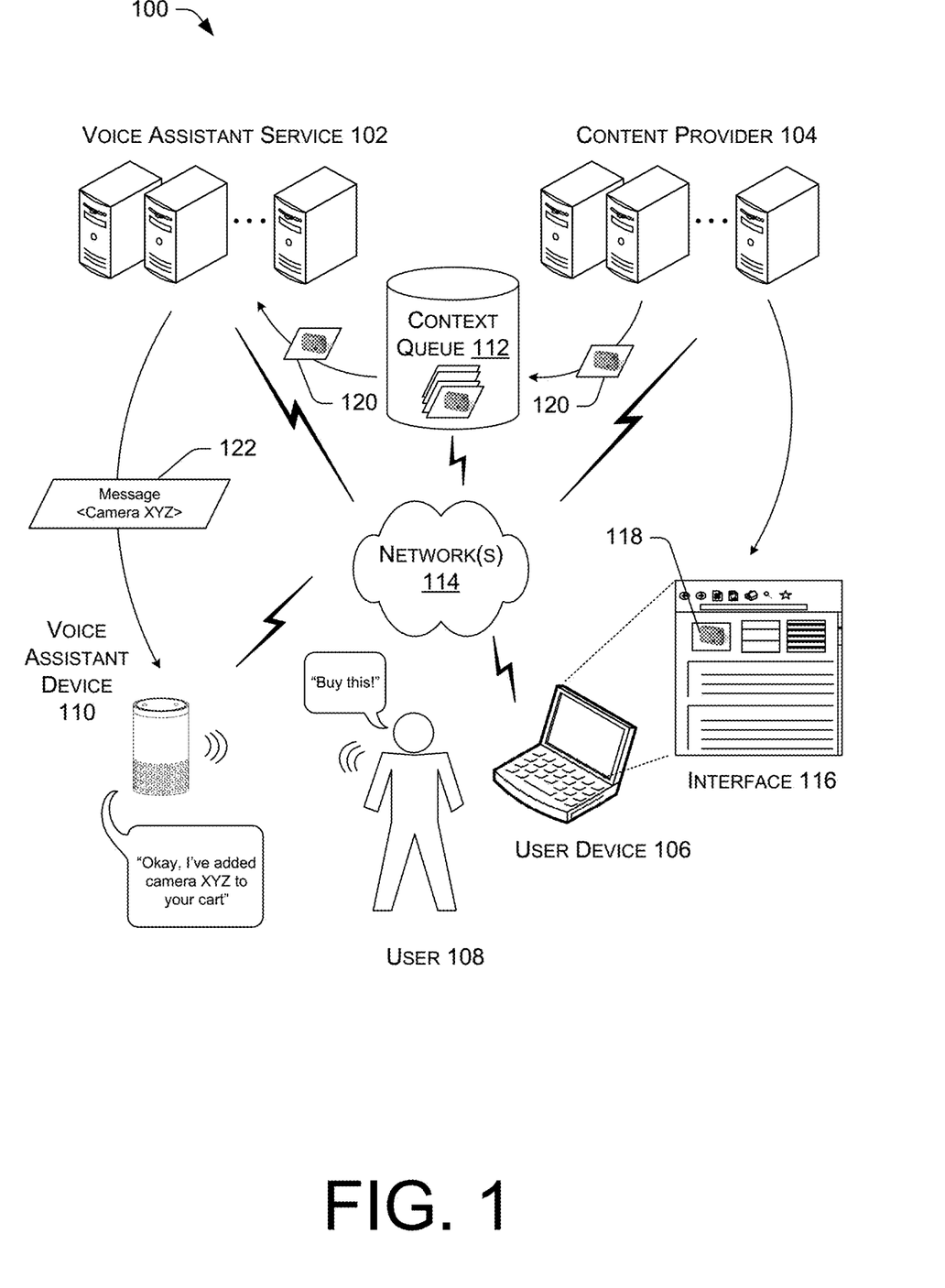
FIG. 1 is a schematic diagram of an illustrative computing environment that includes a voice assistant service that augments information provided by a content provider.

FIG. 1 is a schematic diagram of an illustrative computing environment 100 that includes a voice assistant service 102 that augments information provided by a content provider 104. The environment may include a user device 106 operated by a user 108. The user device 106 may exchange information from the content provider 104. As an example, the user device 104 may execute a browser application that enables the user 108 to interact with content provided by the content provider 104. For example, the content provider 104 may host an electronic marketplace that enables the user 108 to consume products and/or services, referred to collectively herein as "items".

The environment 100 may also include a voice assistant device 110 that operates a voice assistant application. The voice assistant device 110 may be the same devices as the user device 106 or may be a different device (as shown in FIG. 1). The voice assistant device 110 may exchange information with the voice assistant service 102 to provide audible dialog between the user 108 and the voice assistant service 102. The dialog may be used to acquire information (what is "x"?, what is the weather for today?, Tell me the news headlines, etc.), initiate computing actions (e.g., buy this, initiate a transaction, save this for later, play this song, etc.), and/or perform other actions.

In accordance with one or more embodiments, the voice assistant device 110 may be one of any electronic devices that are at least partially controlled using speech commands issued by the user 108. In some embodiments, the voice assistant device 110 may be a dedicated speech recognition device that includes few or no other input controls (e.g., few or no buttons, motion devices, imaging devices, etc.).

Instead, the voice assistant device 110 may receive input from users by receiving spoken commands, which are converted to signals by the voice assistant device 110 and/or by a cloud service, and then processed, such as by an exchange of data with voice assistant service 102. The voice assistant service 102 may be any service that provides data to the voice assistant device 110 in response, directly or indirectly, from the voice assistant device 110. The voice assistant service 102 need not be configured for speech recognition since speech recognition may be performed prior to sending a request to one of the services in some instances. The voice assistant service 102 may provide may different types of information, entertainment, or data, such as by proving music, directions, documents, performing tasks (adding things to lists, setting reminders, starting a timer, adding a calendar event, etc.), and so forth. As discussed herein, the voice assistant service 102 may be configured to engage in a dialog to receive an order of one or more items from the user, including facilitating selection and confirmation of items, and cause those items to be fulfilled and delivered to the use, or for other tasks or fulfillment of audible requests. The voice assistant service 102 and the voice assistant device 110 may be in communication via one or more networks 114, which include wired and/or wireless networks.

The environment 100 enables a user to share information exchanged with the content provider 104 with the voice assistant service 102 to enable the voice assistant service 102 to augment the information provided by the content provider 104. In some embodiments, a context queue 112 may enable sharing some, but not all, information between the content provider 104 and the voice assistant service 102, as explained further below by way of an example. The devices discussed above may communicate by way of one or more networks 114, which may include wireless and/or wired networks.

In this example, the user 108 may use the user device 106 to access a user interface (UI) 116 to view information about an item 118. The user 108 may desire to use the voice assistant device 110 to provide augmented information (including actions) related to the item. Here, the user 108 may issue a voice request to the voice assistant device 110 of "buy this". Currently, such a request would result in an error or a request for clarifying information from the voice assistance system 102, such as a response of "I'm sorry, I don't understand . . . ". However, contextual information may be provided to the voice assistance service 102, via the context queue 112.

To provide context information to the voice assistant service 102, the content provider 104 and the voice assistant service 102 may share associated information about the user 108. The shared information may include a same user profile. For example, the user 108 may be logged in using a user profile to interact with the content provider 104. The user 108 may be logged in to the same user profile, or possibly an associated user profile, to interact with the voice assistant service 102 via the voice assistant device 110. This linking of information may create a conduit, via the context queue 112, for the content provider 104 to share contextual information, after receiving user permission, with the voice assistant service 102. User permissions may be created in advance, and notifications of such sharing of information may be provided to the user, such as by providing messages to the user (e.g., "voice assistance enabled" on a UI, etc.).

In response to providing information to the user device 106 to populate the UI 116 about information pertaining to the item 118, the content provider 104 may provide log information 120 to the context queue. The log information may include some, but not all, of the information provided to the user device 106. In some embodiments, the log information may provide basic or specific information, such as an idem identifier, a URL, or other information that may be used to determine context by the voice assistance service 102. The log information 120 may be associated with metadata, such as a timestamp, usage metrics, user interaction data, and/or other types of data.

Meanwhile, the voice assistant service 102 may receive a message 122 of the audible request of "buy this", which was received via a microphone of the voice assistance device 110. The voice assistance service 102 may analyze the message 122 and determine that context information may be available to deduce a meaning of the audible request. The voice assistance service 102 may request information from the context queue 112 to determine a context. For example, the voice assistance service 102 may submit a request to the context queue 112. The request may include parameters, such as the user profile associated with the message 122, among other possible parameters. In return, the context queue 112 may provide one or more logs to the voice assistance service 102, including the log information 120.

The voice assistant service 102 may analyze the log information 120 to determine a context of the message 122, such as to initiate a transaction for the item 118 to be acquired on behalf of the user 108. For example, the voice assistant device 102 may initiate a transaction with the content provider 104, with another service provider, or using its own service, to acquire the item. In various embodiments, the voice assistant service 102 may perform other operations once the context of the message 122 is determined. For example, the voice assistant service 102 may provide an audible response to the user 108 via a voice assistant device 110, may cause the content provider 104 to refresh content provided to the user device 106, may store data on behalf of the user 108 possibly in association with a user account, and/or may perform other operations in response to the message.

Although the example above discusses use of a context queue that operates as an intermediary between the content provider 104 and the voice assistant service 102, the user device 106 (or software operating thereon) may provide a similar functionality as discussed below. Thus, the voice assistance service 102 may receive contextual information from a different application (or "app") running on the user device 106.

Figure 2:
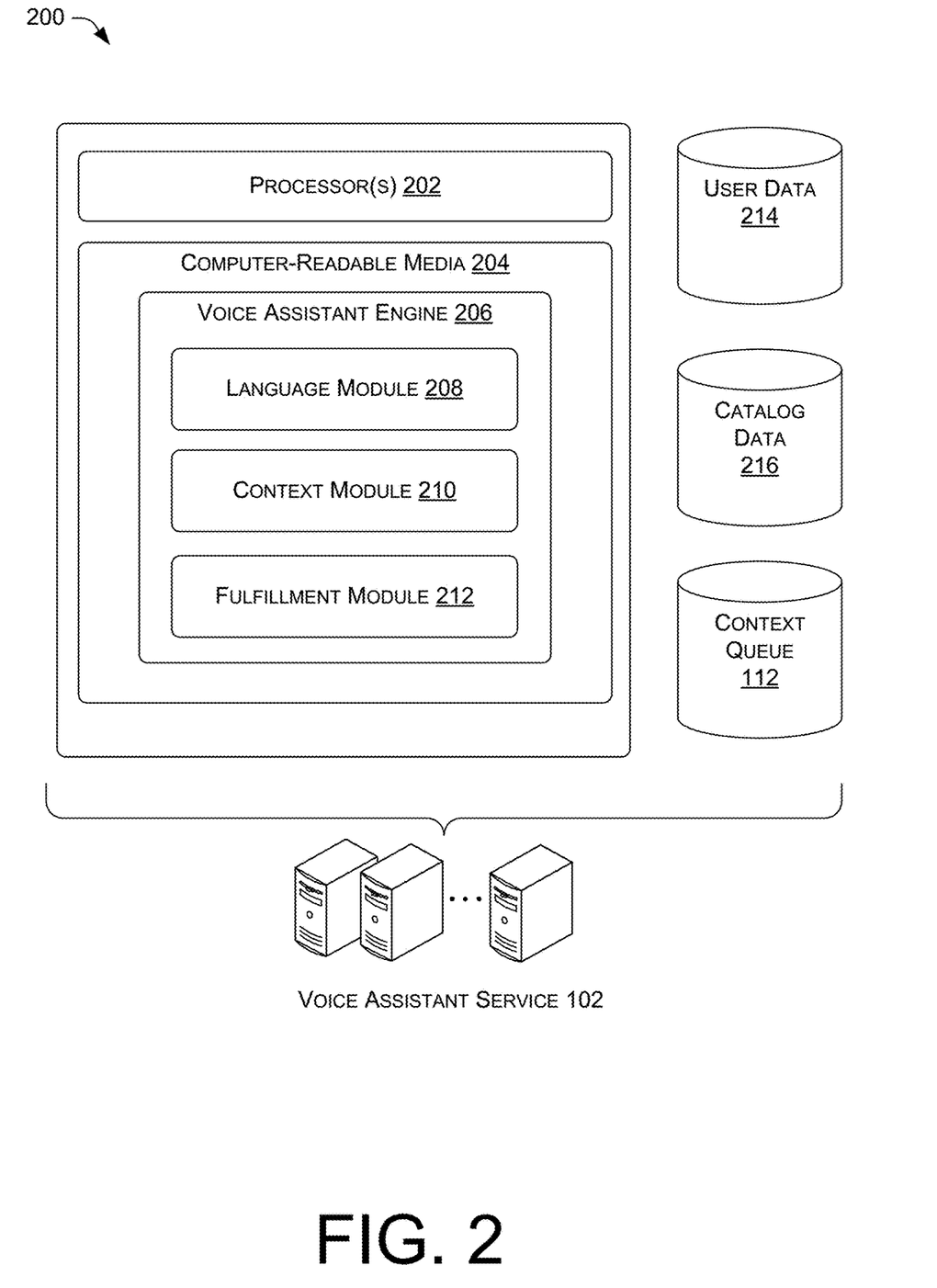
FIG. 2 is a block diagram of an illustrative computing architecture of a voice assistant service.

FIG. 2 is a block diagram of an illustrative computing architecture 200 of a voice assistant service, such as the voice assistant service 102. The computing architecture 200 may be implemented in a distributed or non-distributed computing environment. The computing architecture 200 may include one or more processors 202 and one or more computer-readable media 204 that stores various modules, applications, programs, or other data. The computer-readable media 204 may include instructions that, when executed by the one or more processors 202, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a voice assistant engine 206. The voice assistant engine 206 may further include a language module 208, a context module 210, and a fulfillment module 212, which are described in turn. The voice assistant service may access or include data stores including user data 214, catalog data 216, and the context queue 112. The voice assistant engine 206 and data stores may be stored together or in a distributed arrangement.

The language module 208 may process language inputs received from the user, such as an audible request. For example, the language module 208 may speech-to-text (STT) and/or text-to-speech (TTS) algorithms to convert between text and speech. The language module 208 may deploy automated speech recognition (ASR) algorithms and/or natural language processing (NLP) algorithms to facilitate processing information received from a user. In some embodiments, the language module 208 may determine means for pronouns and/or anaphoras by analyzing use of language rules and information collected from a user from a prior user input and/or from user history via the user data 214. The user data may enable linking the user with contextual information, as discussed below via the context module 210.

The context module 210 may provide additional information for processing an audible request, such as by providing context to enable the voice assistant engine 204 to understand the request, and thus be equipped to respond to the request. The context module 210 may interface with the context queue 212 to obtain contextual information (e.g., log information and/or metadata), which may provide context to an audible request. In some embodiments, the context module 210 may provide some parameters to the context queue 212, such as a user profile, to assist in locating or accessing contextual information which may be securely stored by the context queue 212. In various embodiments, the context module 210 may analyze the contextual information to determine context. For example, the context module 210 may utilize an image analysis module (e.g., an optical character recognition (OCR) algorithm or other image analysis algorithms) to extract and analyze information from the context queue 112. In some embodiments, the context module 210 may identify specific information, such as an item identifier (e.g., a number, code, or other identifier of a specific item), which may be used to provide context for the audible request.

The fulfillment module 212 may process a supplemented request, which may be the audible request that is supplemented by contextual information from the context queue 112, thereby augmenting information provided by the content provider. For example, the fulfillment module 212 may determine information about an item associated with the audible request (via the contextual information), such as via the catalog data 216. The fulfillment module 212 may generate a response to deliver to the voice assistance device (e.g., the voice assistant device 110 or the user device 106, etc.). In some embodiments, the fulfillment module 212 may provide information to a content provider, such as the content provider 104, which may be used to refresh information provided to the user's device (e.g., refresh information associated with a URL accessed by the user device 106, etc.). In various embodiments, the fulfillment module 212 may store information for later retrieval by the user, such as a list of items to acquire and/or other types of information. The fulfillment module 212 may provide other types of computing actions on behalf of the user, such as perform searches in data repositories, modify settings, and/or perform other actions requested by the user and supplemented by the contextual information from the context queue 112. In some embodiments, a response may be processed by the language module 208 prior to transmission to the voice assistance device, such as to perform TTS or NLU via associated algorithms.

Figure 3:
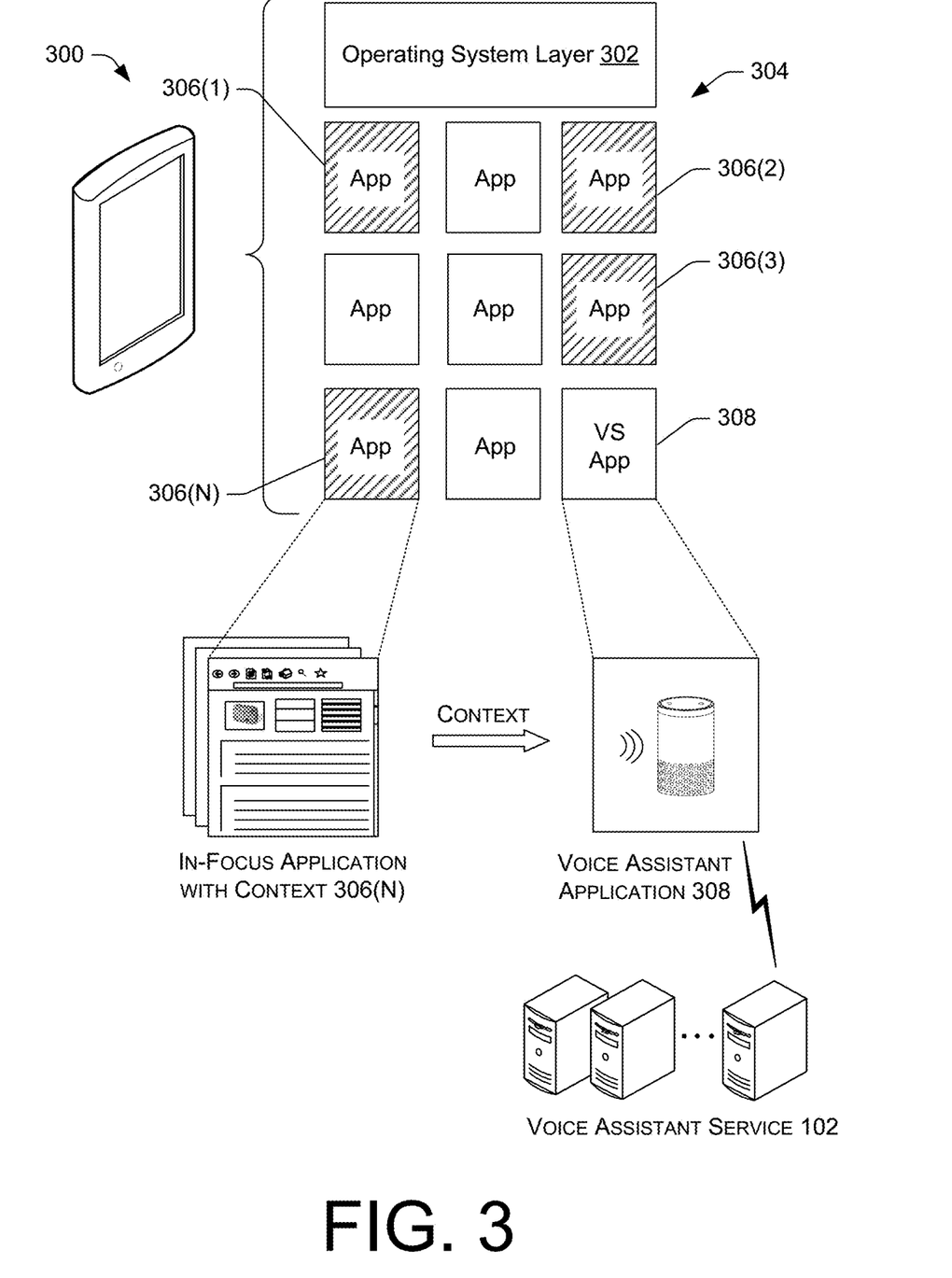
FIG. 3 is a schematic diagram of an illustrative device that includes at least a first application that can share information with a second application in communication with a voice assistant service.

FIG. 3 is a schematic diagram of an illustrative device 300 that includes at least a first application that can share information with a second application in communication with a voice assistant service. The device 300 may include an operating system layer 302 and any number of applications 304. Some applications 306(1)-(N) may be authorized for association with a voice assistant application 308. For example, these applications may share context information with the voice assistant application 308. The context information may be shared by the device, which may act as a context queue as described above. Thus, the device may track information and user interaction with authorized applications, and provide this information from time to time to the voice assistant application 308, such as in response to an audible request provided to the voice assistant application 308. In some embodiments, the voice assistant application 308 may receive application data from a particular application 306(N) that received user manipulation within a threshold period of time. This particular application 306(N) (referred to at times as a second application) may be "in focus" by a user, and manipulated just prior to or during receipt of the audible request by the voice assistant application 308. In some embodiments, the voice assistant application 308 may be a module, plug-in, extension, or other software add-on to the particular application 306(N). However, the voice assistant application 308 and the particular application 306(N) may be separate applications. In various embodiments, the voice assistant application 308 may be part of a core software or the operating system layer 302.

The voice assistant application 308 may provide context information gained from the particular application 306(N) to the voice assistant service 102. The voice assistant service 102 may then process the request, such as "buy this" using the context information that may accompany the audible request or be associated with the audible request.

FIGS. 4-8 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
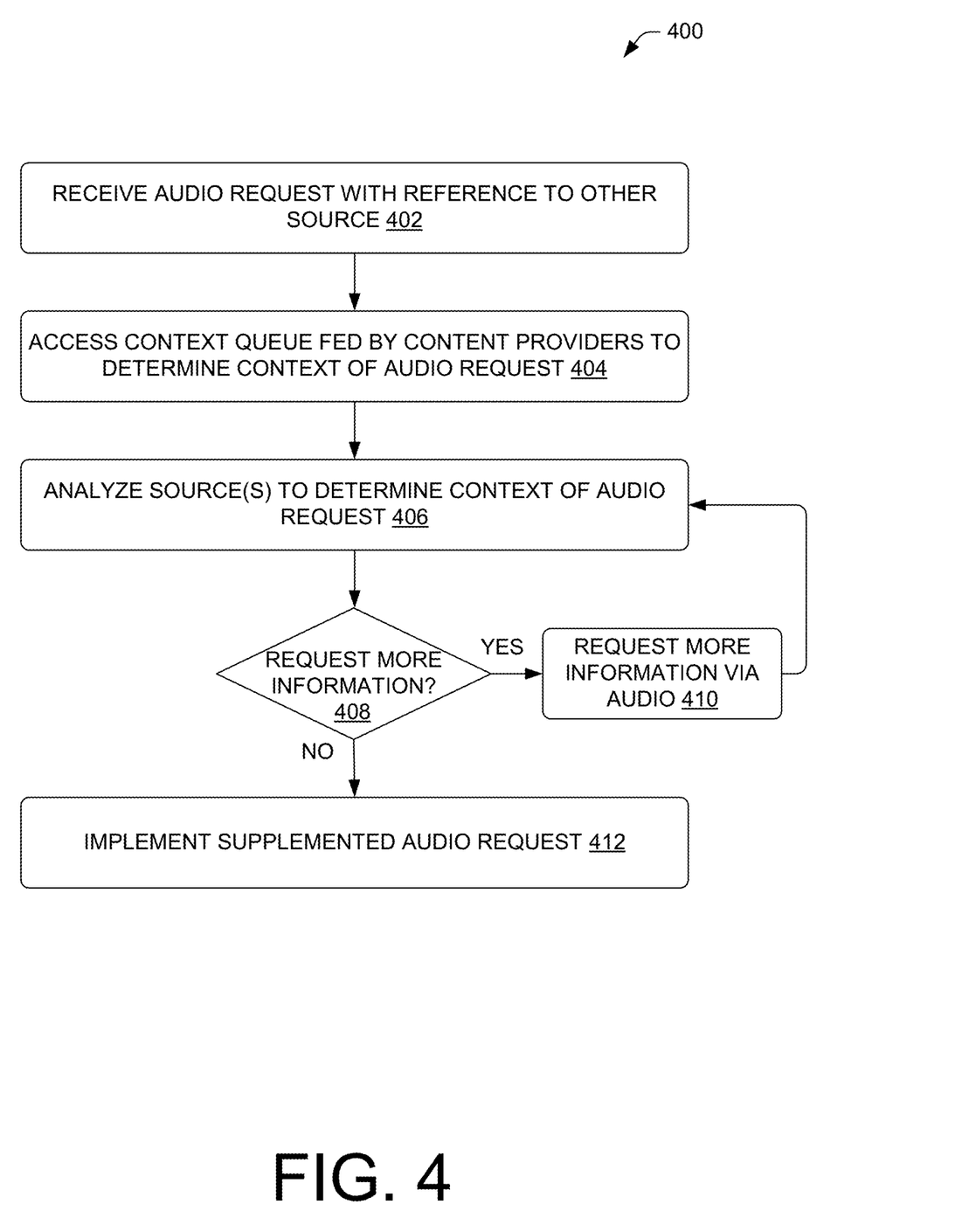
FIG. 4 is a flow diagram of an illustrative process to augment information from a content provider using a voice assistant service.

FIG. 4 is a flow diagram of an illustrative process 400 to augment information from a content provider using a voice assistant service. The process 400 is described with reference to the environment 100 and the computing architecture 200 and may be performed by the voice assistant service 102. Of course, the process 400 may be performed in other similar and/or different environments.

At 402, the voice assistant service 102 may receive an audio request with reference to other source of information, such as information viewed by the user via a different application or via a different device. For example, the audio request may include language that refers to another sources of data, such as "this" or "that", or the request may not provide information specific enough to complete a request, such as "buy this toaster." The other source of information may be provided by the content provider 104, which may be associated with the voice assistant service 102 via a common user profile. The audio request may be an audio file of speech from a user. The voice assistant service 102 may process the audio request, via a language module 208, such as to determine text of the request and/or other information about the request, and possibly the association with the content provider.

At 404, the voice assistant service 102 may access, after receiving appropriate user authorization(s), the context queue 112 populated by content providers to determine a context of the audio request. For example, the voice assistant service 102 may send parameters and/or other information to the context queue 112 to request and receive log information. The log information may include an image, textual data, or other information and/or metadata to enable the voice assistant service 102 to determine a context of the audio request. As an example, the log information may include an item identifier that may provide a subject of the audio request, such as an audio request of "buy this" or "recommend other items similar to that".

At 406, the voice assistant service 102 may analyze source(s), such as the log information, to determine context of audio request. The voice assistant service 102 may use information in the audio request to determine the context. For example, the request may specify "buy this toaster", but the request may not specify which model. The model information may be found in the context queue in associated log information. In some embodiments, the voice assistant service 102, via the context module 210, may use algorithms to analyze the log information from the context queue 112 to determine the context information. For example, the voice assistant service 102 may use a OCR algorithm to inspect text captured in an image or from a URL associated with the log data. The voice assistant service 102 may inspect multiple logs from different user devices to determine which one maps to the audio request, possibly using usage history, and which log includes relevant contextual information. For example, when the log include information from multiple devices, one device may be identified as a likely matching device when it's browsing history represented in the log information is similar to questions received via the voice assistant service 102 (e.g., both include topics related to baby items, for example).

At 408, the voice assistant service 102 may determine whether to request more information to determine a context of an audio request. For example, when the voice assistant service 102 includes enough information to understand and respond to an audio request that is supplemented by context information derived from the context queue, then the voice assistant service 102 may not request additional information from the user. When the voice assistant service 102 does not include enough information to understand and respond to the audio request that is supplemented by context information derived from the context queue (following the "yes" route from the decision operation 408), then the process 400 may advance to an operation 410.

At 410, the voice assistant service 102 may request additional information from the user by sending an audio request to the user via the voice assistant device or voice assistant application. The request may be a choice, such as "did you mean "buy a toaster or diapers". In some instances, the response may be a request for more specific information, such as "Please provide more information so I can fulfill your request".

When the voice assistant service 102 does include enough information to understand and respond to the audio request that is supplemented by context information derived from the context queue (following the "no" route from the decision operation 408), then the process may advance to an operation 412. At 412, the voice assistant service 102 may implement supplemented audio request. For example, the voice assistant service 102 may provide an audio response to the user via the voice assistant device or voice assistant application.

Figure 5:
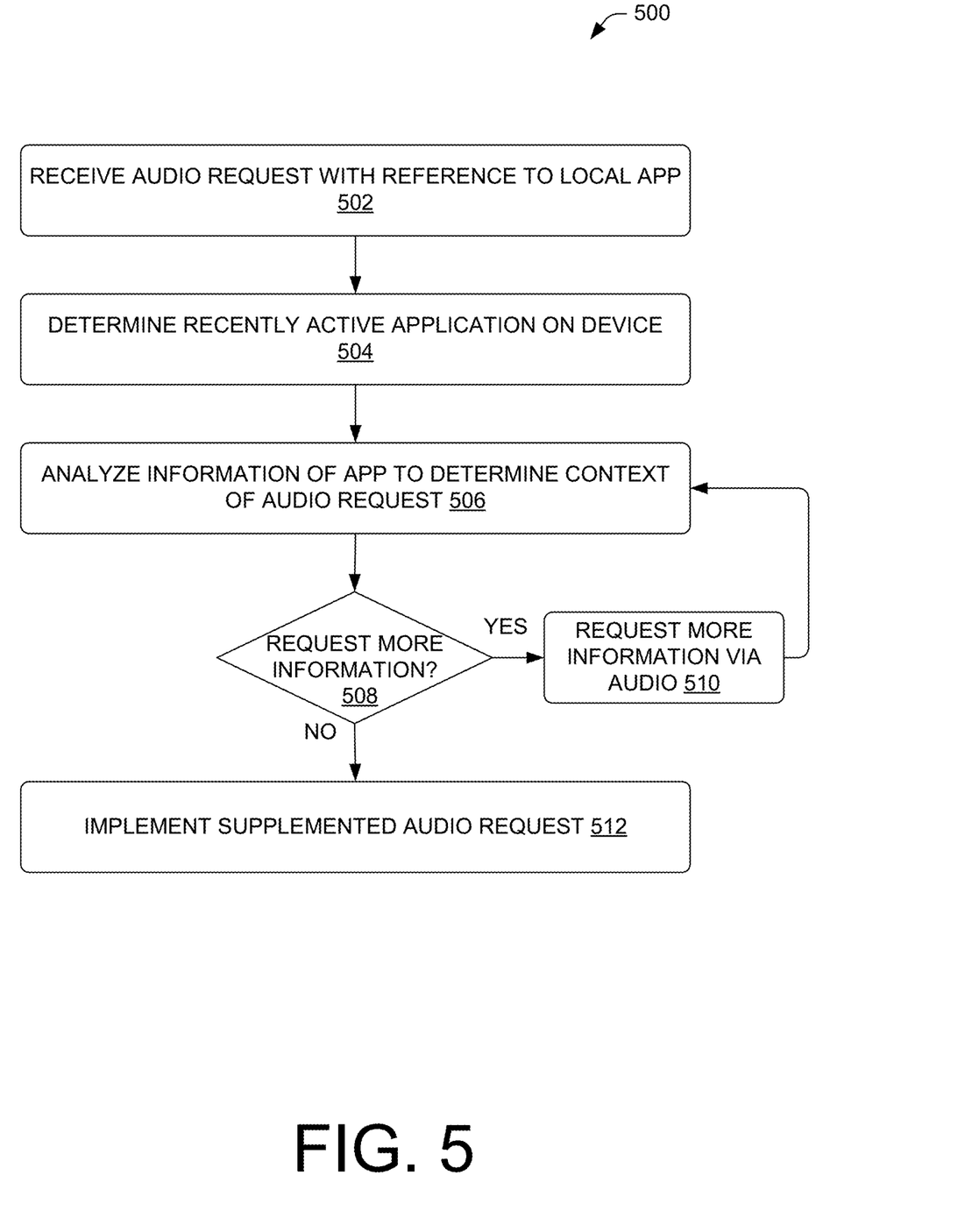
FIG. 5 is a flow diagram of an illustrative process to determine context of a voice request based on content provided by a different application running on a device.

FIG. 5 is a flow diagram of an illustrative process 500 to determine context of a voice request based on content provided by a different application running on a device. The process 500 is described with reference to the environment 100 and the computing architecture 200 and may be performed by the voice assistant service 102. Of course, the process 500 may be performed in other similar and/or different environments.

At 502, the voice assistant service 102 may receive an audio request from a voice assistant application on a device with reference to another application executed by the same device. For example, the audio request may include language that refers to data from a different application as "this" or "that", or the request may not provide information specific enough to complete a request, such as "tell me more about this." The audio request may be an audio file of speech from a user. The voice assistant service 102 may process the audio request, via a language module 208, such as to determine text of the request and/or other information about the request.

At 504, the voice assistant service 102 may determine a recently active application executed by the device, which also executes the voice assistant application. The active application may be a second application that received user manipulation within a threshold period of time relative to issuance of the audio request at the operation 502.

At 506, the voice assistant service 102 may receive and analyze information from the application (e.g., the second application) to determine context of audio request. The voice assistant service 102 may use information in the audio request to determine the context. For example, the request may specify "when was this song recorded", but the request may not specify which exact song. The song information may be found by inspecting information accessed from the second application. In some embodiments, the voice assistant service 102, via the context module 210, may use algorithms to analyze the information from the second application to determine the context information. For example, the voice assistant service 102 may use a OCR algorithm to inspect text captured in an image or from a URL associated with the second application.

At 508, the voice assistant service 102 may determine whether to request more information to determine a context of an audio request. For example, when the voice assistant service 102 includes enough information to understand and respond to an audio request that is supplemented by information from the second application, then the voice assistant service 102 may not request additional information from the user. When the voice assistant service 102 does not include enough information to understand and respond to the audio request that is supplemented b by information from the second application (following the "yes" route from the decision operation 508), then the process 500 may advance to an operation 510.

At 510, the voice assistant service 102 may request additional information from the user by sending an audio request to the user via the voice assistant application. The request may be a choice, such as "did you mean "song ABC or song XYZ". In some instances, the response may be a request for more specific information, such as "Please provide more information so I can fulfill your request".

When the voice assistant service 102 does include enough information to understand and respond to the audio request that is supplemented by information from the second application (following the "no" route from the decision operation 508), then the process may advance to an operation 512. At 512, the voice assistant service 102 may implement supplemented audio request. For example, the voice assistant service 102 may provide an audio response to the user via the voice assistant application.

Figure 6:
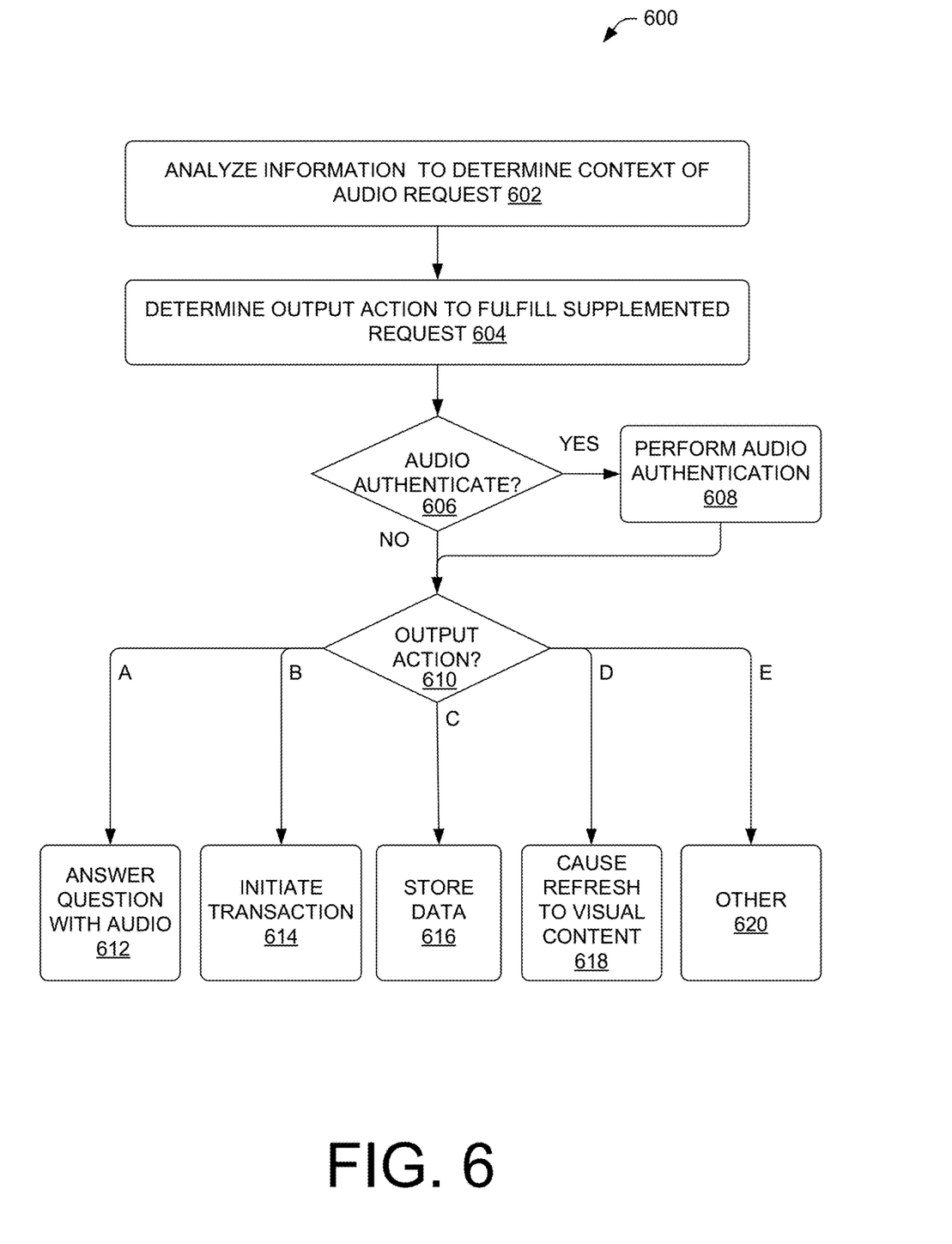
FIG. 6 is a flow diagram of an illustrative process to determine outputs of a voice assistant service to augment content provided by a different application or device.

FIG. 6 is a flow diagram of an illustrative process 600 to determine outputs of a voice assistant service to augment content provided by a different application or device. The process 600 is described with reference to the environment 100 and the computing architecture 200 and may be performed by the voice assistant service 102. Of course, the process 600 may be performed in other similar and/or different environments.

At 602, the voice assistant service 102 may analyze information to determine context of an audio request. The operation 602 may be similar to the operation 406 and/or the operation 506 discussed above. For example, the voice assistant service 102 may inspect information provided by another application running on a same device or may inspect information in the context queue, which is populated by content providers that also interact with a same user via a user device.

At 604, the voice assistant service 102 may determine an output action to fulfil the supplemented request. For example, the voice assistant may determine an output format or action based on various options available to the particular configuration. Some options may be unavailable for some types of request.

At 606, the voice assistant service 102 may determine whether to perform an audio authentication. The audio authentication may authenticate a user and/or access to perform an action, such as execute a command, access information, or for other reasons. For example, some legacy devices may not support the latest security authentication mechanisms enforced by a server. Due to this, user may have to perform an additional authentication step for certain actions or purchases. This two-factor authentication usually involves sending an email and entering the One Time Password and/or re-logging in to complete an action or transaction. However, audio authentication may be used by the voice assistant service as a solution. As an example, the voice assistant service 102 may analyze the audio request as authentication information to allow a privileged computing action. The analysis may include analyzing an account associated with the audio request, a time of the request, a location associated with the request, a voice signature of the request, and/or other attributes of the audio request.

When audio authentication is to be performed (following the "yes" route from the decision operation 608), then the process 600 may continue at the operation 608. At 608, audio authentication may be performed.

At 608, in some embodiments, the voice assistant service may receive an audio request and authenticate based on receipt of this audio request (e.g., based on the logged in state of the voice assistant application or voice assistant device). Here, the audio request may be linked or associated with a user account (e.g., via backend processing using shared resources), which is also associated with the content viewed on the second application. A confirmation page or reply (possibly via audio) may confirm completion of this action.

At 608, in various embodiments, the voice assistant service 102 may receive a code generated by the second application or may provide a code to be input to the second application for authentication between the applications. Here, the authentication may be performed using input via the first application (e.g., the voice assistant application, etc.) and/or the second, different application. For example, the code may be a sequence of numbers/letters that can be spoken by the user for receipt by the voice assistant service or manually input into the second application. Ultimately, back end processing may confirm the code is correct, which may be performed by sharing information across the content provider and the voice assistant service, for example.

Following operation 608, or when no audio authentication is to be performed (following the "no" route from the decision operation 608), then the process 600 may continue at the operation 610.

At 610, the voice assistant service 102 may determine an output action. The output may be determined and implemented by the fulfillment module 212.

Following a first route "A" from the decision operation 610, the voice assistant service 102 may advance to an operation 612. At 612, the voice assistant service 102 may cause output of an audio response that answers a question posed in the audio request, and supplemented by the context information. For example, the audio request may be a question such as "what year was this song recorded" and the operation 612 may include "the song 'Tangled up in Blue' was recorded in 1974 by Bob Dylan".

Following a first route "B" from the decision operation 610, the voice assistant service 102 may advance to an operation 614. At 614, the voice assistant service 102 may initiate a transaction for an item on behalf of the user. For example, the audio request may include "buy this toaster." By supplementing the request with context information, the voice assistant service 102 may determine a specific brand and model of the toaster, and may initiate a transaction for the item via the operation 614. In some embodiments, the voice assistant service 102 may initiate the transaction via a content provider, and possibly a content provider that identified the context to the voice assistant service 102.

Following a first route "C" from the decision operation 610, the voice assistant service 102 may advance to an operation 616. At 616, the voice assistant service 102 may store data or other information on behalf of the user for later retrieval by the user (e.g., in response to a later request from the user, etc.). For example, the voice assistant service 102 may receive an audio request of "save this book to my list" or "add this to my shopping cart." At 616, the voice assistant service 102 may add data to a list, such as by storing data in association with the user profile after supplementing the request with the contextual information.

Following a first route "D" from the decision operation 610, the voice assistant service 102 may advance to an operation 618. At 618, the voice assistant service 102 may cause the content provider to refresh data provided to a user device to fulfill, at least in part, the audio request. For example, the voice assistant service 102 may receive a request of "show me more books like this" while the user is viewing an electronic bookstore via a second application or device. The voice assistant service 102 may determine the book referred to as "this" via the contextual information. At 618, the voice assistant service 102 may transmit a request to the content provider to cause a refresh of information served to a device associated with the user who made the audio request, to cause output of more books, such as by graphically outputting recommended books similar to the book referenced via the contextual information.

Following a first route "E" from the decision operation 610, the voice assistant service 102 may advance to an operation 620. At 620, the voice assistant service 102 may provide other outputs as a reply to the audio request. As an example, the voice assistant service 102 may provide at 620 a request for more information, an error, a playback of media associated with the request, or other information that satisfies or is expected to satisfy the audio request supplemented with the contextual information.

Figure 7:
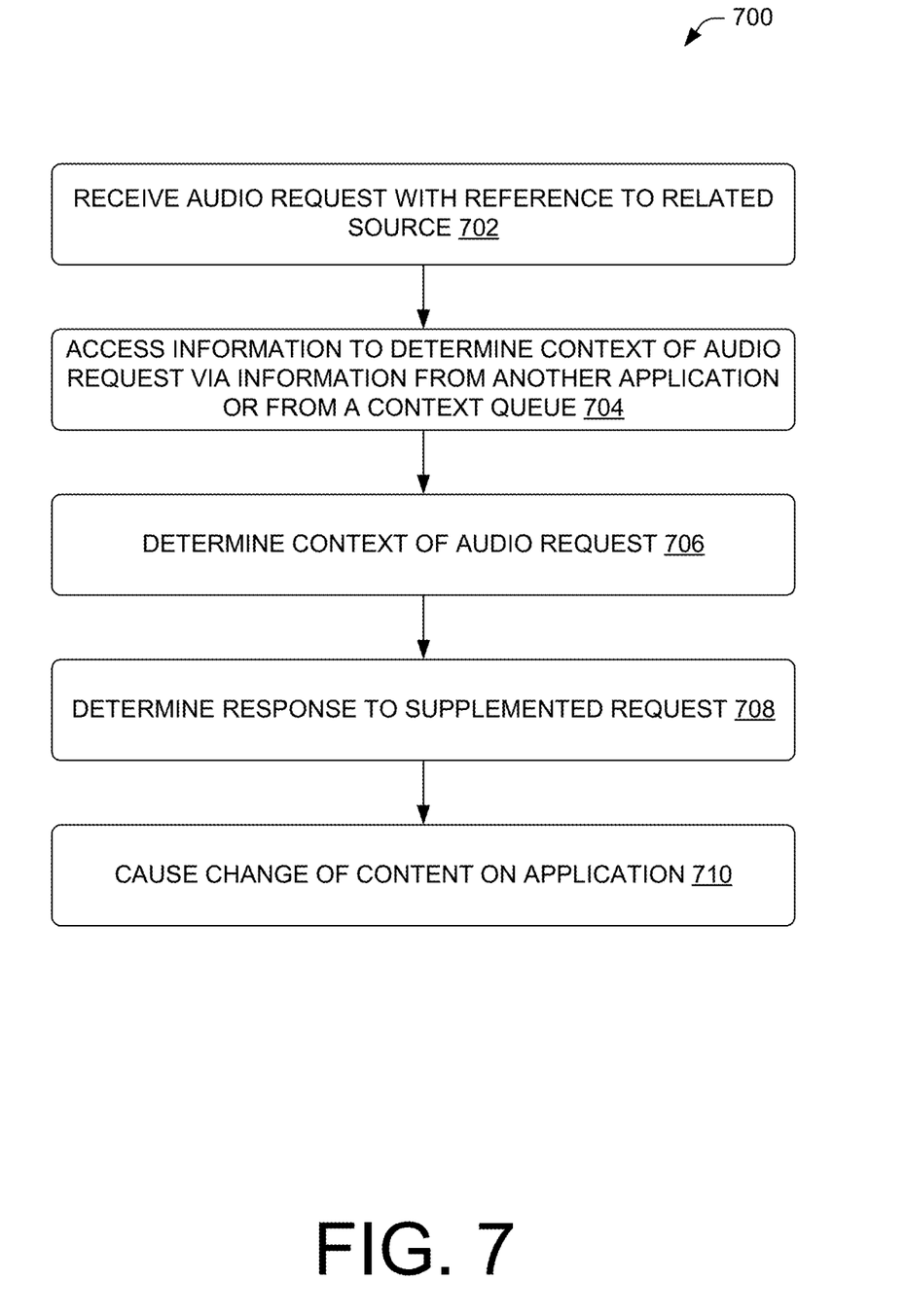
FIG. 7 is a flow diagram of an illustrative process to analyze a request received by voice assistant service and to refresh graphical content provided to a device based on the request.

FIG. 7 is a flow diagram of an illustrative process 700 to analyze a request received by voice assistant service and to refresh graphical content provided to a device based on the request. The process 700 is described with reference to the environment 100 and the computing architecture 200 and may be performed by the voice assistant service 102. Of course, the process 700 may be performed in other similar and/or different environments.

At 702, the voice assistant service 102 may receive an audio request with reference to a related source (e.g., information on an application or other device used by a same user having a same user profile, etc.). The operation 702 may be similar to the operation 402 and/or the operation 502 discussed above.

At 704, the voice assistant service 102 may access information to determine a context of the audio request. The voice assistant service 102 may access a context queue (e.g., similar to the operation 404). The voice assistant service 102 information from another application (e.g., similar to the operation 504).

At 706, the voice assistant service 102 may determine the context of the audio request to determine a supplemented request. The voice assistant service 102 may access a context queue (e.g., similar to the operation 404). The voice assistant service 102 may determine the context from analyzing log information from the context queue (e.g., similar to the operation 406). The voice assistant service 102 may determine the context from analyzing information from a second application running on a same device that provided the audio request (e.g., similar to the operation 506).

At 708, the voice assistant service 102 may determine a response to the supplemented request. The response may be to provide graphical information to the user via the second application or via the different device.

At 710, the voice assistant service 102 may cause a change in content provided by an application (e.g., the second application and/or another device). The voice assistant service 102 may transmit a request to a content provider associated with the context information from the context queue or associated with the second application. The voice assistant service 102 may request the content provider provide certain information to the user via a refresh operation (e.g., an AJAX call or other techniques to refresh content provided to an application such as a browser or dedicated application or "app".). As an example, the audio request may be "show me more books like this one". The voice assistant service 102 may transmit a request at 710 to the content provider to request delivery of recommended books associated with the supplemented request (e.g., associated with a specific book), and provided to the user via a refresh of content or other change of content via the content provider.

Figure 8:
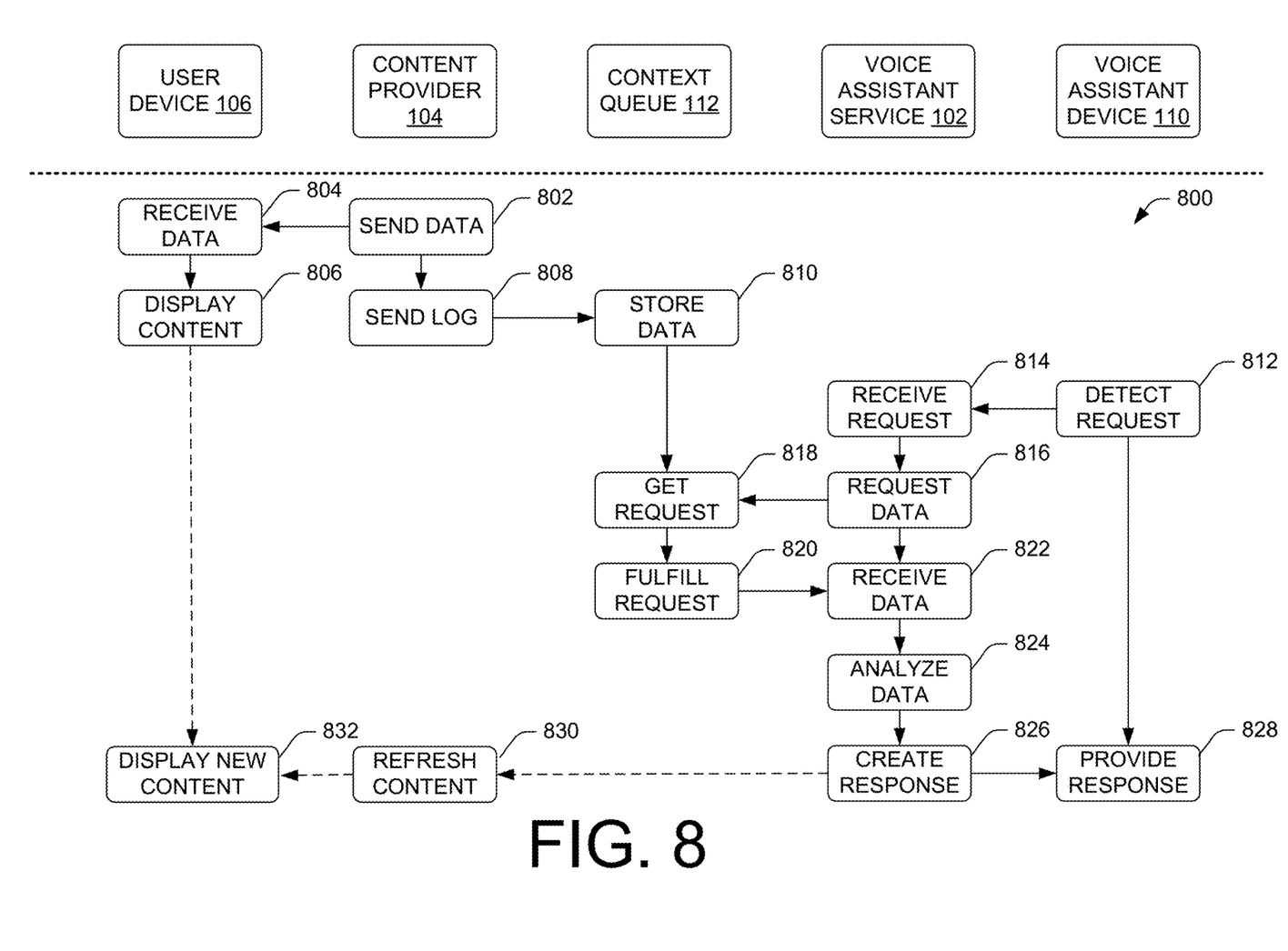
FIG. 8 is a flow diagram of an illustrative process exchange information between various devices using a context queue to enable providing context to voice-based requests for a voice assistant service.

FIG. 8 is a flow diagram of an illustrative process 800 exchange information between various devices using a context queue to enable providing context to voice-based requests for a voice assistant service. The operations in the process 800 are shown under devices that may perform the operations. However, the operations may be performed by other devices in some instances. For example, the user device 106 may operate the voice assistant application, and may be a same device as the voice assistant device 110 in some instances.

The process 800 may begin at an operation 802 where a content provider 104 sends data to a user device 106, which is received an operation 804 and displayed or output via the user device at an operation 806.

At 808, the content provider 104 may send log data to the context queue 112. The log data may be an image, a URL, metadata, an item identifier, and/or other data. At an operation 810, the context queue 112 may store the log information, possibly with metadata such as a timestamp, an associated user profile, and/or other information.

Meanwhile, at an operation 812, the voice assistant device 110 may detect an audio request via a microphone. At an operation 814, the voice assistant service 102 may receive the request from the voice assistant device 110.

At an operation 816, the voice assistant service 102 may request log information from the context queue 112, which may get the request at an operation 818 and may fulfill the request at an operation 820. For example, the voice assistant service 102 may pass parameters to the context queue 112, such as a user profile and a time period, which may be used to query for associated log information that provides contextual information for the audio request received at the operation 814. At an operation 822, the voice assistant service 102 may receive the data (e.g., the log information) from the context queue 112.

At an operation 824, the voice assistant service 102 may analyze the data (e.g., the log information) to determine a context of the audio request received at the operation 814. At an operation 826, the voice assistant service 102 may create a response to the audio request, which is supplemented by the context from the operation 824.

The voice assistant service 102 may provide the response, via audio, to the voice assistant device 110 at an operation 828. At the operation 828, the voice assistant device may cause output of the audio response.

In some embodiments, the response created at the operation 826 may be output via the user device 106 as discussed in the process 700 described with reference to FIG. 7. At 826, the voice assistant service 102 may send a request to the content provider to refresh content provided to the user device 106. The content provider 104 may refresh the content or otherwise cause output of certain content informed based at least in part by the voice assistant service 102 via the operation 826. At an operation 832, the user device 110 may output the refreshed content for display to the user.

Figure 9:
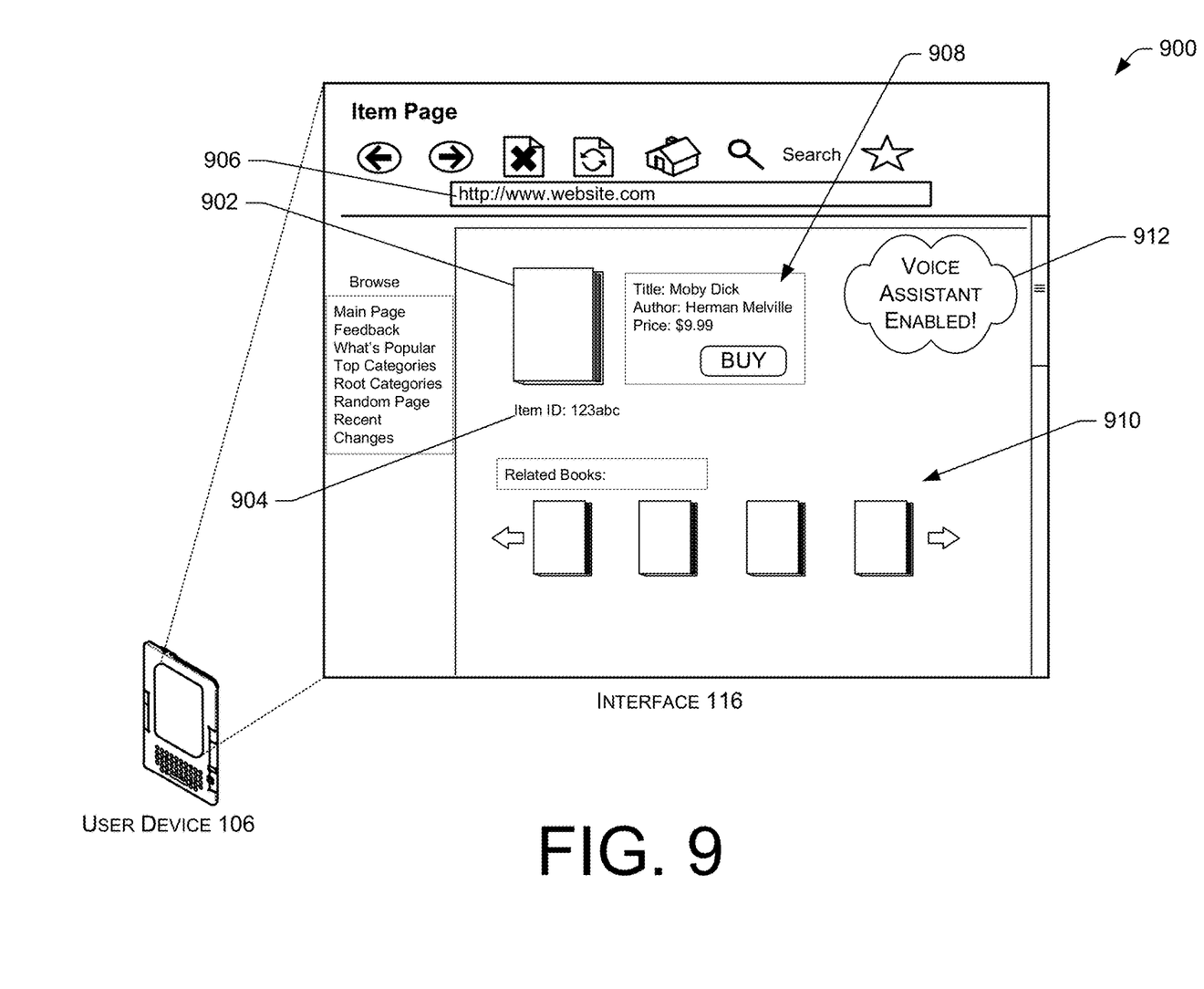
FIG. 9 shows an illustrative user interface (UI) that indicates compatibility with a voice assistant service.

FIG. 9 shows an illustrative user interface (UI) 900 that indicates compatibility with a voice assistant service. The UI 900 may include content provided by the content provider 104 shown in FIG. 1. The UI 900 may show an item 902 which may be associated with an item identifier 904 and a source 906, such as a URL. The UI 900 may provide other information 908 about the item. The UI 900 may provide other items 910, such as related items, advertisements, recommendations, and/or other items.

The UI 900 may provide an indication 912 that indicates that a voice assistant service is enabled for this content. For example, when the content provider stores information about the UI 900 in the context queue, the content provider may cause display of the indication 912. The indication 912 may serve to inform users of an ability to make audio request related to this content as described above.

The context queue may include different types of log information to represent the information included in the UI 900. In some embodiments, the log information may include the source 906, such as a URL or network address. The log information may include the item identifier 904. The log information may include an image of the UI 900 or an image of a portion of the UI 900. The log information may include text included in the UI 900, such as HTML code used to create the UI 900. The log information may include combinations of the aforementioned information and/or other information. Analysis of the log information may provide contextual information to the voice assistant service to enable fulfillment of an audio request as disclosed above. For example, an OCR algorithm may be used to extract information from an image stored as the log information.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing executable instructions that, when executed, cause one or more computing devices to perform acts comprising:
receiving, at a first time from a device via a voice assistant application executed by the device, an audio request referencing an item available for purchase;
converting the audio request to a text request;
receiving application data from the device from a different application that received user manipulation, the user manipulation occurring at a second time that is during, or prior to, receipt of the audio request issued at the first time;
analyzing at least log information stored in a context queue comprising the application data;
determining a context of the text request as a supplemented text request, based at least in part on content that is represented in a log from the context queue and that is identified as being associated with data of the text request, wherein the content is associated with the item available for purchase and comprises at least one of a uniform resource locator (URL), an item identifier, or information extracted via optical character recognition (OCR) of a displayed image or a screenshot of the device;

sending a request to a content provider associated with the different application, the request to cause the content provider to change the application data provided by the different application to the device as changed application data;

determining a text response based at least in part on the changed application data;

converting the text response to an audio response; and providing the audio response to the voice assistant application for playback by the device.

2. The one or more computer-readable media as recited in claim 1, wherein the different application is a browser, and wherein the application data is an item page associated with an electronic marketplace.

3. The one or more computer-readable media as recited in claim 1, wherein the context of the text request is determined based at least in part on at least one of the displayed image or the screenshot of the device, from which the information is extracted via OCR.

4. The one or more computer-readable media as recited in claim 1, further comprising determining that the supplemented text request is a user request to purchase the item available for purchase, wherein the context of the text request is determined based at least in part on at least one of the item identifier or an item description associated with the item available for purchase, and wherein sending the request comprises initiating a transaction to purchase the item available for purchase, on behalf of a user.

5. A system comprising:
one or more processors; and
memory to store computer-executable instructions that, when executed, cause the one or more processors to perform acts to:
receive, from a first device at a first time via a voice assistant application executed by the first device, an audio request referencing an item;
convert the audio request to a text request;
determine that the text request references a context queue that stores log information about user-interaction with a second device, the user-interaction occurring at a second time that is during, or prior to, receipt of the audio request at the first time;
analyze a log from the context queue;
determine a context of the text request as a supplemented text request, based at least in part on content that is represented in the log and that is identified as being associated with data of the text request, wherein the content is associated with the item and comprises at least one of a uniform resource locator (URL), an item identifier, or information extracted via optical character recognition (OCR) of a displayed image or a screenshot of the second device;
determine a text response based at least in part on the supplemented text request;
convert the text response to an audio response; and
provide the audio response to the voice assistant application.

6. The system as recited in claim 5, wherein the context queue comprises the log from a first source and a different log from a second source, and the computer-executable instructions further cause the one or more processors to perform acts comprising selecting the log based at least in part on metadata associated with the log.

7. The system as recited in claim 5, wherein the log information about user-interaction with the second device comprises the URL or a network address associated with the content accessed by the second device.

8. The system as recited in claim 5, wherein the computer-executable instructions further cause the one or more processors to perform acts to initiate a transaction to purchase the item based at least in part on at least one of the item identifier or an item description associated with the item.

9. The system as recited in claim 5, wherein the computer-executable instructions further cause the one or more processors to perform acts to cause a content provider associated with the content represented in the log to refresh content provided to the second device based at least in part on the text response.

10. The system as recited in claim 5, wherein the computer-executable instructions further cause the one or more processors to perform acts to analyze the audio request as authentication information to allow a privileged computing action.

11. The system as recited in claim 5, wherein the computer-executable instructions further cause the one or more processors to perform acts to store second log information about the user-interaction for later access by a user, and wherein the audio response indicates at least a confirmation that the second log information is stored.

12. The system as recited in claim 5, wherein the voice assistant application executed by the first device and a different application executed by the second device are associated with a same user profile, and wherein the log is selected based at least in part on the log being associated with the same user profile.

13. The system as recited in claim 5, wherein the log comprises the displayed image or the screenshot of the second device, and wherein the computer-executable instructions further cause the one or more processors to perform acts to perform OCR on the displayed image or the screenshot to determine the context.

14. The system as recited in claim 5, wherein the log comprises the item identifier, and wherein the context is based at least in part on the item identifier.

15. A computer-implemented method comprising:
receiving, from a first application and via a voice assistant service, an audio request referencing an item;
converting the audio request to a text request;
determining that the text request references content provided by a second application that is different than the first application based at least in part on user input received via the second application during, or prior to, receipt of the audio request;
analyzing log information stored in a context queue, the log information comprising the content provided by the second application;
determining a context of the text request as a supplemented text request, based at least in part on the content that is represented in a log from the context queue and that is identified as being associated with data of the text request, wherein the content is associated with the item and comprises at least one of a uniform resource locator (URL), an item identifier, or information extracted via optical character recognition (OCR) of a displayed image or a screenshot;
determining a text response based at least in part on the supplemented text request;
converting the text response to an audio response; and
providing, via the voice assistant service, the audio response to the first application.

16. The computer-implemented method as recited in claim 15, further comprising associating the first application and the second application using a same user profile.

17. The computer-implemented method as recited in claim 15, wherein the second application is a browser and the content is associated with the URL or a network address accessed by the browser.

18. The computer-implemented method as recited in claim 15, wherein the context is the item, and further comprising initiating a transaction to purchase the item on behalf of a user, based at least in part on the item identifier received in the log from the context queue.

19. The computer-implemented method as recited in claim 15, wherein determining the text response comprises determining additional attributes of the item associated with the second application, and wherein providing the audio response comprises providing audio based at least in part on the additional attributes to augment information output by the second application.

20. The one or more computer-readable media as recited in claim 1, wherein the log information is associated with the user manipulation and comprises at least one of a timestamp, usage metrics, or user interaction data.

\* \* \* \* \*